June 20, 1939.　　W. H. BASELT　　2,163,534
BRAKE ARRANGEMENT
Filed March 27, 1937　　5 Sheets-Sheet 3
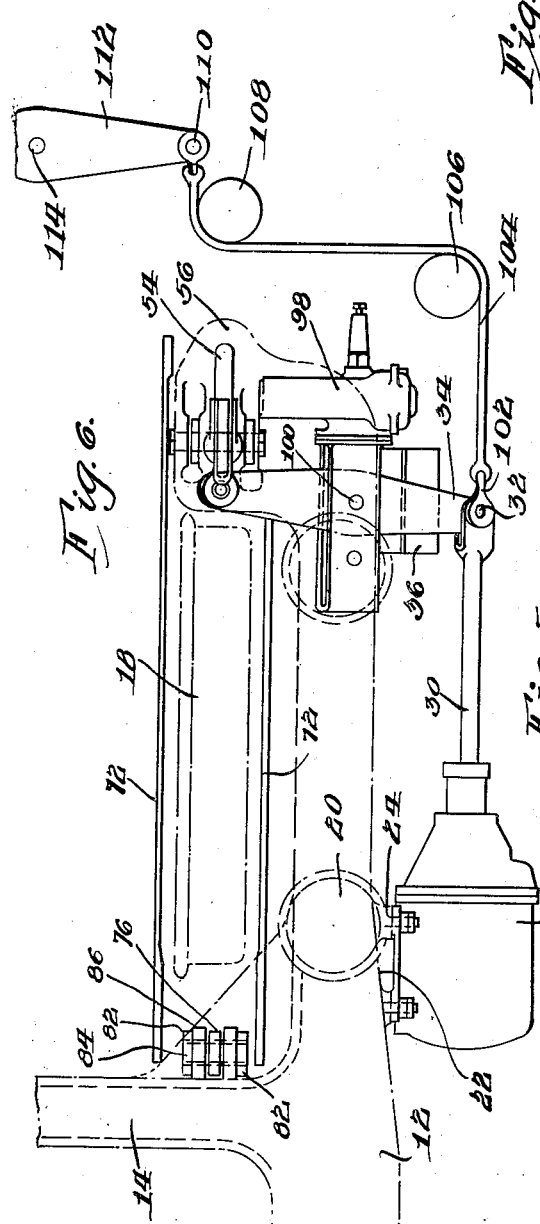
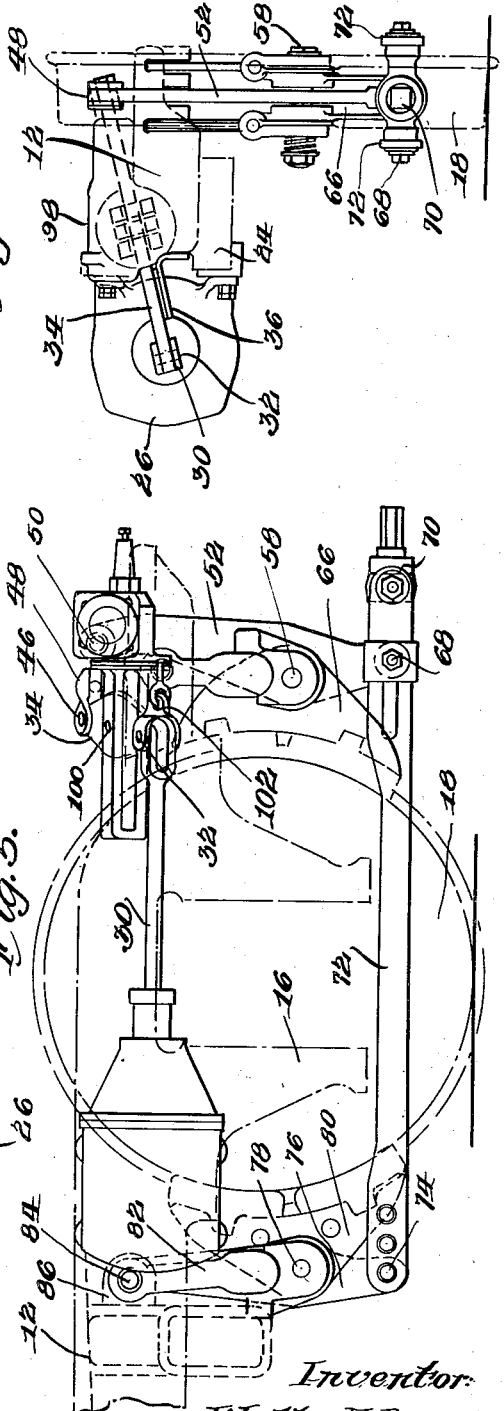
Inventor:
Walter H. Baselt

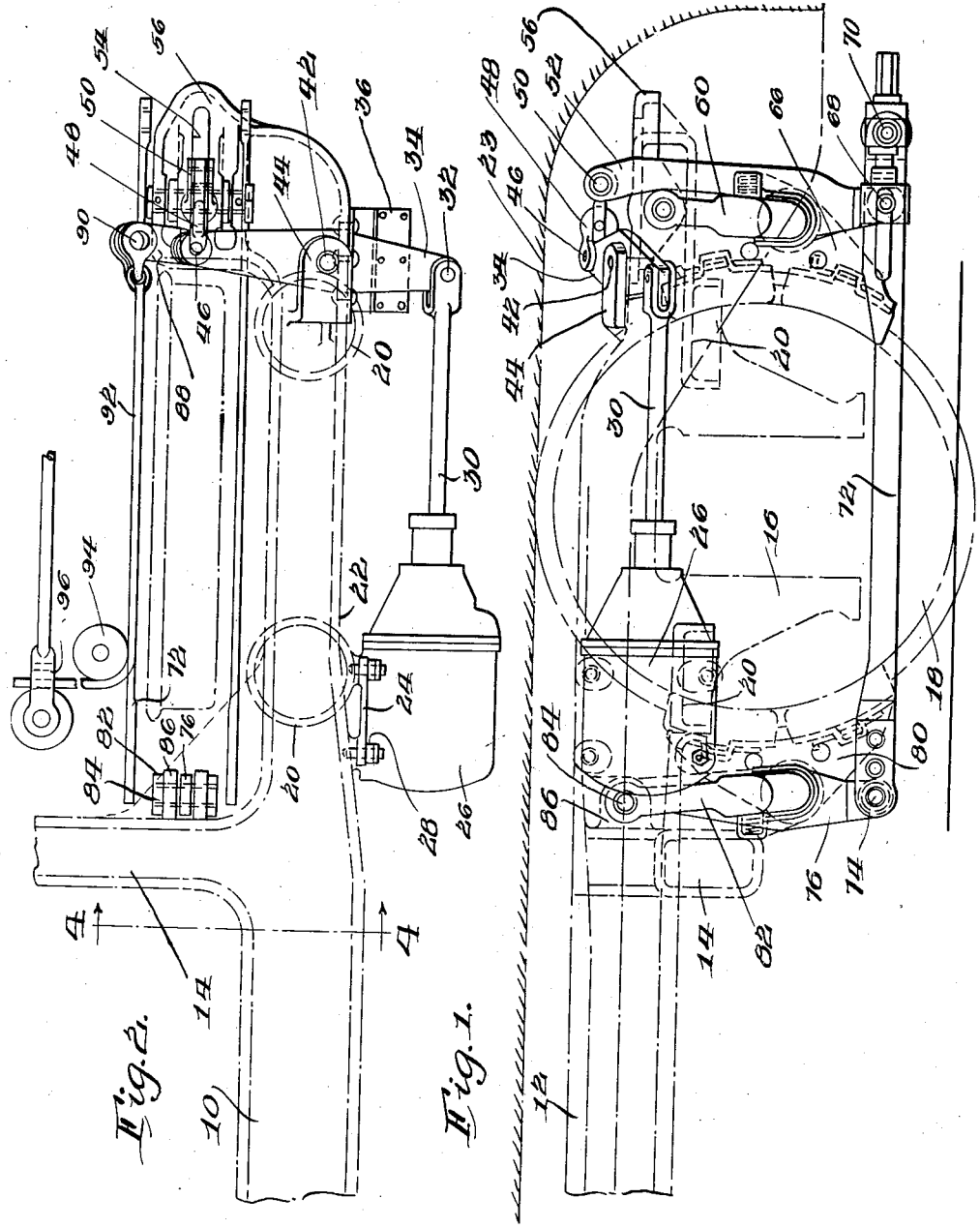

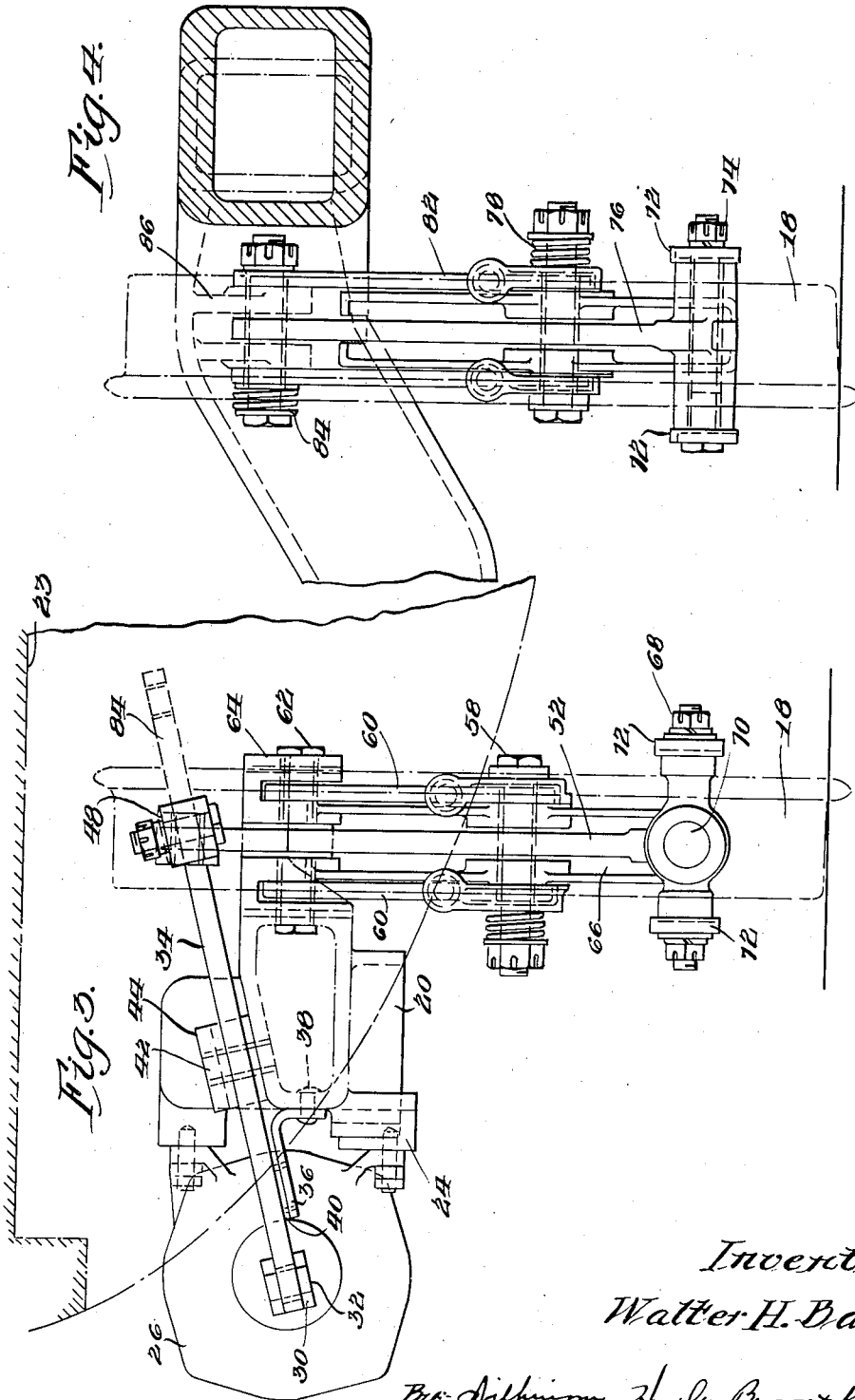

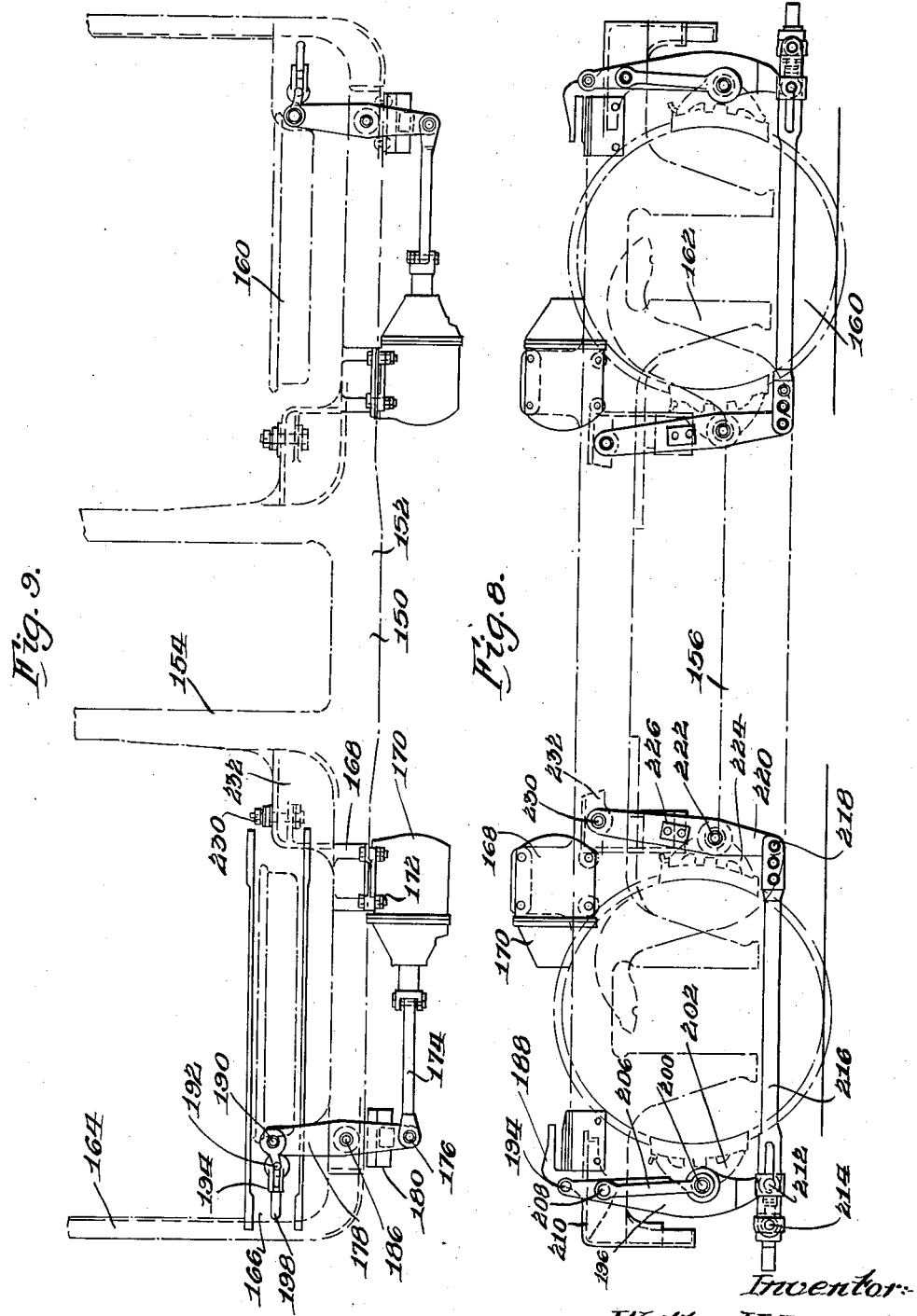

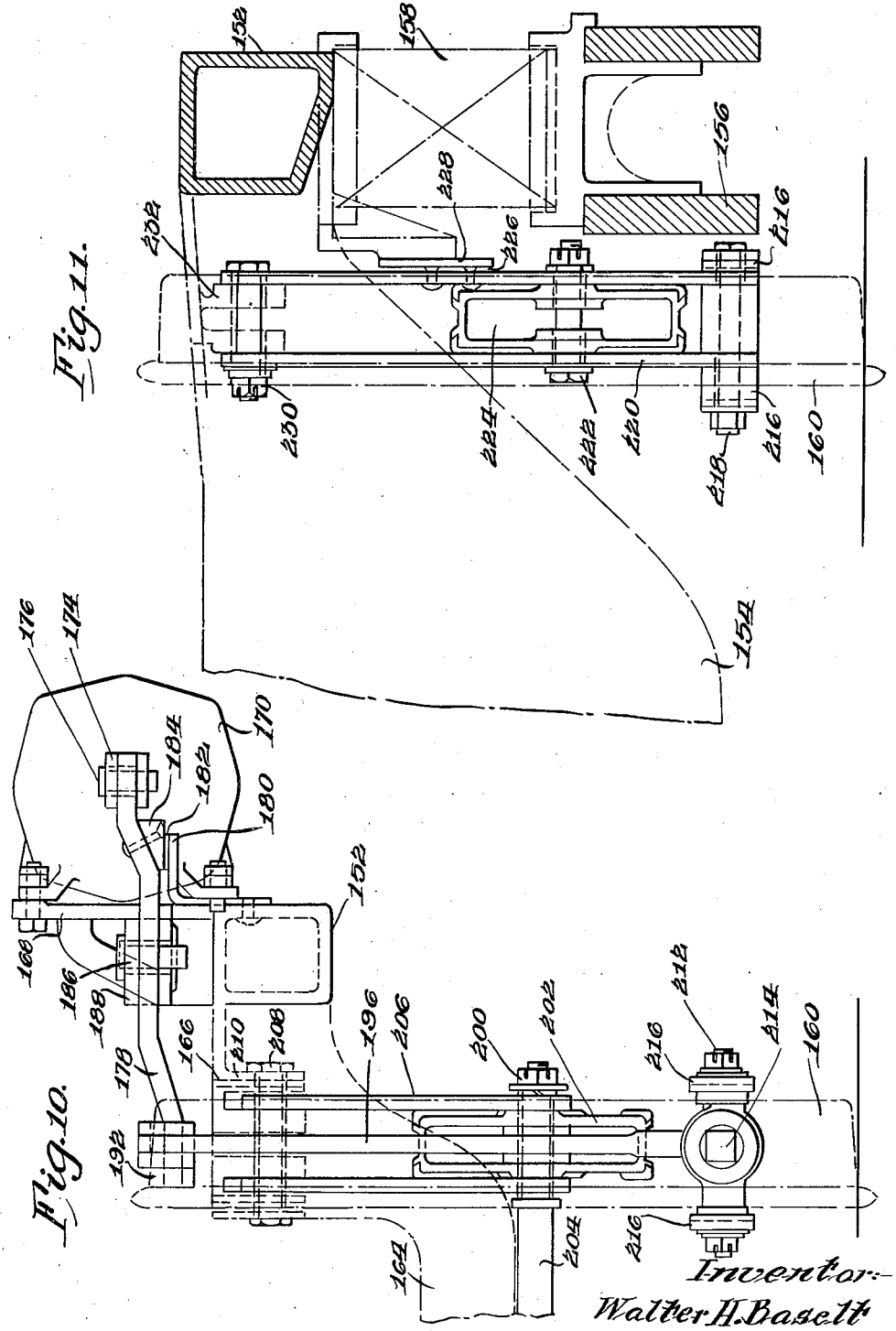

Patented June 20, 1939

2,163,534

UNITED STATES PATENT OFFICE 2,163,534

BRAKE ARRANGEMENT

Walter H. Baselt, Chicago, Ill., assignor to American Steel Foundries, Chicago, Ill., a corporation of New Jersey Application March 27, 1937, Serial No. 133,467

19 Claims. (Cl. 188—56)

This invention pertains to a brake arrangement, and more particularly to a unit cylinder clasp brake for high speed trucks.

It is an object of this invention to provide a unit cylinder clasp brake for four-wheel motor trucks.

Another object is to provide a unit cylinder clasp brake for high speed trailer trucks.

Still another object is to provide a brake arrangement for a truck of low center of gravity and wherein the brake operating means and the brakes are disposed substantially below the top of the wheel.

A different object is to provide hand brake operating means for clasp brakes for high speed trailer or motor trucks.

A still different object is to provide a unit cylinder clasp brake which is inexpensive to make and maintain, and fulfills all requirements of manufacture and service.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1 is a fragmentary side elevation of one end of a high speed trailer truck construction having a brake arrangement embodying the invention applied thereto;

Figure 2 is a fragmentary top plan view of the truck and brake construction illustrated in Figure 1;

Figure 3 is a transverse fragmentary end elevation of the truck and brake construction illustrated in Figure 1, the same looking toward the left as viewed in said figures;

Figure 4 is a transverse fragmentary sectional elevation taken substantially in the plane as indicated by the line 4—4 of Figure 2;

Figure 5 is a fragmentary side elevation corresponding to Figure 1 showing a modified form of brake arrangement;

Figure 6 is a fragmentary top plan view of the truck and brake construction shown in Figure 5 and showing a hand brake connection;

Figure 7 is a transverse fragmentary end elevation of the truck and brake construction shown in Figure 5, the same looking toward the left as viewed in said figure and omitting the hand brake;

Figure 8 is a side elevation of a truck construction embodying another modified form of brake arrangement, the same being particularly adapted for use on a motor truck;

Figure 9 is a fragmentary top plan view of the truck and brake construction illustrated in Figure 8;

Figure 10 is a fragmentary end elevation of the truck construction illustrated in Figures 8 and 9; and Figure 11 is a transverse fragmentary sectional elevation taken substantially in the plane of the transverse center line of the truck construction illustrated in Figures 8 and 9.

Referring first of all to the truck and brake constructions illustrated in Figures 1 to 7 inclusive, it is to be understood that the brake constructions for each wheel are substantially the same. The truck frame 10 includes the side frame 12, the side frames at opposite sides of the truck being integrally connected by means of the spaced transoms 14 for reception of suitable bolsters (not shown), the same being preferably resiliently supported on suitable swing hangers pivoted to the side frame. The side frame is provided with the spaced pedestals 16 adapted to receive suitable journal means of the wheel and axle assemblies 18, said journal means being provided with spring seats on each side thereof for reception of coil springs adapted to be seated adjacent the upper ends thereof in the spaced coil spring seats 20 disposed on each side of the pedestals.

Inasmuch as these trucks are for high speed trains, as low a center of gravity as possible is maintained, and thus in the embodiment shown the tops of the wheels project above the tops of the side frames, and the side frames adjacent said wheels are offset inwardly toward said wheels as at 22, yet ample clearances are provided between the truck, wheel and axle assemblies and the car body 23. At said offset portion 22 and adjacent the inboard spring seat 20, a supporting bracket 24 is provided for the operating cylinder 26 secured to said bracket as at 28. The cylinder is thus disposed substantially to one side and above said pedestal opening, yet below the top of the side frame. The cylinder 26 is provided with the elongated piston 30 pivoted adjacent the outer end thereof as at 32 to the outer end of the dead cylinder lever 34. The cylinder lever 34 slopes inwardly and upwardly and is slidably supported on the bracket 36 secured to the side frame at 38, said bracket preferably being provided with a wear plate 40.

The dead cylinder lever is pivoted as at 42 to the bracket 44 provided on said side frame, and the upper inner end of said cylinder lever is pivotally connected as at 46 to the clevis 48, the other end of said clevis being pivotally connected as at 50 to the upper end of the live brake or truck lever 52. Said truck lever 52 extends through a suitable slot 54 provided in the bracket 56 of the side frame, and is so disposed that the truck lever lies in the plane of the adjacent wheel. The truck lever is pivotally connected as at 58 to the brake hangers 60, the upper ends of said hangers being pivotally connected as at 62 to the bracket 64 provided on the truck frame bracket 56.

The truck lever is also pivotally connected as at 58 to the brake head 66, said brake head being provided with the suitable brake shoes adapted to have braking cooperation with the periphery of the adjacent wheel. The lower end of the live brake lever is pivotally connected as at 68 to the manually operated slack adjuster 70. Said slack adjuster 70 is provided with the spaced connecting straps 72 which are adjustably pivoted adjacent the inner ends thereof as at 74 to the inner dead brake lever 76. The inner dead brake lever 76 is pivotally connected as at 78 to the inner brake head 80 provided with suitable brake shoes adapted for braking cooperation with the inner periphery of the adjacent wheel. The brake lever 76 is also pivoted as at 78 to the spaced hangers 82, the hangers 82 and the brake lever 78 being pivotally connected adjacent the upper ends thereof as at 84 to the truck frame through the brackets 86.

In the construction shown in Figures 1 to 4 inclusive, the upper end of the dead cylinder lever 34 may be provided with the extension 88 pivotally connected as at 90 to the flexible connection 92 extending to the dead cylinder lever on the opposite side of the truck. The flexible connection 92 passes over the sheave 94, and hand brake operating means 96 preferably disposed on the longitudinal center line of the truck cooperates with said flexible connection and the hand brake of the car.

In the construction illustrated in Figures 5, 6 and 7, the extension 88 is omitted from the cylinder lever, and instead of the fixed bracket 44 an automatic slack adjuster 98 is disposed on the truck frame, and the dead cylinder lever is pivoted intermediate the ends thereof to said slack adjuster as at 100. The outer end of the dead cylinder lever at pivot 32 is provided with the connection 102 for the flexible connection 104. The flexible connection 104 extends over the sheaves 106 and 108 and is pivotally connected as at 110 to the hand brake equalizer 112 which is preferably connected as at 114 to the hand brake operating means, the connection 114 being preferably on the longitudinal center line of the truck.

Assuming the brakes to be in released position, movement of the piston outwardly toward the end of the truck causes pivotal movement of the cylinder lever about the pivot 42 or 100 causing inward movement of the upper end of the live brake lever to apply the outer brake shoe. Continued movement of the outer brake lever causes the straps 72 to be moved outwardly to apply the inner brake shoe by movement of the dead brake lever 76 about its pivot 84. Release operation is of course in a reverse direction.

In the construction illustrated in Figures 8 to 11 inclusive, the truck frame 150 includes the side frame 152, the side frames at opposite sides of the truck being connected by the spaced transoms 154 for reception of a suitable bolster, the truck frame being adapted to be resiliently supported upon the equalizers 156 through suitable coil springs 158. The equalizers extend between suitable journal means of the wheel and axle assemblies 160, said journal means being mounted between the spaced pedestals 162. The spaced side frames are likewise connected adjacent the ends thereof by means of the end rails 164 disposed between the end brackets 166 provided on said side frames.

In this form of construction the side frame is provided with the upwardly extending cylinder brackets 168 disposed adjacent the transoms, and a brake cylinder 170 is secured as at 172 to each of said brackets. Each brake cylinder is provided with the elongated piston rod 174 pivotally connected as at 176 to the outer end of the dead cylinder lever 178. Said cylinder lever is offset downwardly, being slidably mounted on the bracket 180 provided on the side frame, the bracket and cylinder lever being preferably provided with the wear pieces 182 and 184. The cylinder lever is pivotally connected as at 186 to the bracket 188 provided on the side frame, and said cylinder lever is offset downwardly inwardly of said bracket and is pivoted as at 190 to the clevis 192. The clevis 192 is pivotally connected as at 194 to the upper end of the live brake or truck lever 196. The truck lever 196 extends through a suitable slot 198 provided in the bracket 166 and is pivotally connected as at 200 to the outer brake head 202, brake heads at opposite sides of the truck being connected by means of the brake head ties 204, said brake head 202 being provided with a suitable shoe adapted for braking cooperation with the outer periphery of the adjacent wheel.

The live brake lever is also connected as at 200 to the brake hangers 206, the upper end of said brake hangers being pivotally connected as at 208 to the brackets 210 provided on the truck frame bracket 166. The lower end of said live brake lever is pivotally connected as at 212 to the manually operated slack adjuster 214 which is provided on the spaced tie straps 216. The inner ends of the tie straps 216 are adjustably and pivotally connected as at 218 to the lower end of the dead brake lever 220. The brake lever 220 is pivotally connected as at 222 to the inner brake head 224, said brake head being provided with a suitable brake shoe adapted for braking cooperation with the inner periphery of the adjacent wheel. The outer of the dead brake levers is provided with the wear piece 226 adapted to guidingly engage the bracket 228 provided on the side frame. The upper end of the dead brake levers is pivotally connected as at 230 to the depending bracket 232 disposed between the side frame and the adjacent transoms. The operation of this form of brake rigging is similar to that already described.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

What is claimed is—

1. In a brake arrangement, the combination of a truck frame, brake mechanism for said wheel comprising a wheel disposed in supporting relation to said frame, a brake cylinder supported on said truck frame, a dead cylinder lever pivoted to said truck frame, said cylinder having a piston pivoted to said cylinder lever, a live truck lever pivoted to said cylinder lever, a dead truck lever pivoted to said frame on the opposite side of said wheel from said live truck lever, and a connection between said dead and live truck levers, said brake mechanism being disposed substantially below the top of said frame.

2. In a brake arrangement, the combination of a truck frame having a pedestal, a wheel disposed in supporting relation to said frame, said pedestal being adapted to receive journal means of said wheel, brake mechanism for said wheel comprising a brake cylinder supported on said side frame inwardly of said pedestal, a cylinder lever disposed outwardly of said pedestal, said cylinder having a piston pivotally connected to said cylinder lever, a slack adjuster provided on said side frame and being pivotally connected to said cylinder lever, brake means for said wheels, and a pivotal connection between said cylinder lever and brake means, said brake mechanism being disposed substantially below the top of said frame.

3. In a brake arrangement, the combination of a truck frame having journal cooperating means, a wheel disposed in supporting relation to said truck frame at said journal means, an inner dead brake lever pivotally supported by said truck frame in the plane of said wheel, an outer live brake lever disposed in the plane of said wheel, hangers pivotally supporting said live brake lever to said truck frame, a connection between said brake levers below the wheel center, a dead cylinder lever pivotally connected to said live brake lever substantially below the top of the wheel, said cylinder lever being pivoted to said side frame intermediate the ends of said lever and sloping downwardly and outwardly below the top of said truck frame, a cylinder supported on said truck frame substantially below the top of said truck frame and at the opposite side of said journal means from said cylinder lever, said cylinder having a piston pivotally connected to the outer end of said cylinder lever below the top of said truck frame.

4. In a brake arrangement, the combination of a truck frame, brake mechanism for said wheel comprising a wheel disposed in supporting relation to said frame, a brake cylinder supported on said truck frame below the top thereof, a dead cylinder lever pivoted to said truck frame, said cylinder having a piston pivoted to said cylinder lever, a live truck lever pivoted to said cylinder lever, a dead truck lever pivoted to said frame on the opposite side of said wheel from said live truck lever, and a connection between said dead and live truck levers extending below the wheel center, said brake mechanism being disposed substantially below the top of said frame.

5. In a brake arrangement, the combination of a truck frame having a pedestal, a wheel disposed in supporting relation to said frame, said pedestal being adapted to receive journal means of said wheel, brake mechanism for said wheel comprising a brake cylinder supported on said side frame at one side of said pedestal, a cylinder lever disposed at the opposite side of said pedestal, said cylinder having a piston pivotally connected to said cylinder lever, a slack adjuster provided on said side frame and being pivotally connected to said cylinder lever, brake means for said wheels, a pivotal connection between said cylinder lever and brake means, said brake means including a live truck lever on the outside of said wheel, a dead truck lever on the inside of said wheel, and a connection between said dead and live truck levers, said brake mechanism being disposed substantially below the top of said frame.

6. In a brake arrangement, the combination of a truck frame having a pedestal, a wheel disposed in supporting relation to said frame, said pedestal being adapted to receive journal means of said wheel, brake mechanism for said wheel comprising a brake cylinder supported on said side frame at one side of said pedestal, a cylinder lever disposed at the opposite side of said pedestal, said cylinder having a piston pivotally connected to said cylinder lever, a slack adjuster provided on said side frame and being pivotally connected to said cylinder lever, brake means for said wheels, a pivotal connection between said cylinder lever and brake means, said brake means including a live truck lever on the outside of said wheel, a dead truck lever on the inside of said wheel, and a connection between said dead and live truck levers extending below the wheel center, said brake mechanism being disposed substantially below the top of said frame.

7. In a brake arrangement, the combination of a truck frame, a wheel disposed in supporting relation to said frame, brake mechanism for said wheel comprising a brake cylinder supported on said truck frame, a dead cylinder lever pivoted to said truck frame, said cylinder having a piston pivoted to said cylinder lever, a live truck lever pivoted to said cylinder lever, a dead truck lever pivoted to said frame on the opposite side of said wheel from said live truck lever, a connection between said dead and live truck levers, said cylinder lever having an inner extension, and other brake operating means connected to said extension, said brake mechanism being disposed substantially below the top of said frame.

8. In a brake arrangement, the combination of a truck frame, a wheel disposed in supporting relation to said frame, brake mechanism for said wheel comprising a brake cylinder supported on said truck frame, a dead cylinder lever pivoted to said truck frame, said cylinder having a piston pivoted to said cylinder lever, a live truck lever pivoted to said cylinder lever, a dead truck lever pivoted to said frame on the opposite side of said wheel from said live truck lever, a connection between said dead and live truck levers, said cylinder lever having an inner extension, and other brake operating means connected to said extension and extending inboard of said truck frame, said brake mechanism being disposed substantially below the top of said frame.

9. In a brake arrangement, the combination of a truck frame, a wheel disposed in supporting relation to said frame, brake mechanism for said wheel comprising a brake cylinder supported on said truck frame, a dead cylinder lever pivoted to said truck frame, said cylinder having a piston pivoted to said cylinder lever, a live truck lever pivoted to said cylinder lever, a dead truck lever pivoted to said frame on the opposite side of said wheel from said live truck lever, a connection between said dead and live truck levers, additional brake operating means connected to the outer end of said cylinder lever and extending outboard of said truck frame, and operating means for said last named brake operating means disposed substantially on the longitudinal center line of said truck frame, said brake mechanism being disposed substantially below the top of said frame.

10. In a brake arrangement, the combination of a truck frame having a pedestal, a wheel disposed in supporting relation to said frame, said pedestal being adapted to receive journal means of said wheel, a bracket disposed on said side frame at one side of said pedestal and between the wheel axis and transverse center of the truck frame, brake mechanism for said wheel comprising a brake cylinder secured to said bracket, a cylinder lever disposed at the opposite side of said pedestal from said cylinder, said cylinder having a piston pivotally connected to said cylinder lever, a slack adjuster provided on said side frame and being pivotally connected to said cylinder lever, brake means for said wheels, and a pivotal connection between said cylinder lever and brake means, said brake mechanism being disposed substantially below the top of said frame.

11. In a brake arrangement, the combination of a truck frame having journal cooperating means, a wheel disposed in supporting relation to said truck frame at said journal means, an inner dead brake lever pivotally supported by said truck frame, an outer live brake lever, hangers pivotally supporting said live brake lever to said truck frame, a connection between said brake levers below the wheel center, a dead cylinder lever pivotally connected to said live brake lever substantially below the top of the wheel, said cylinder lever being pivoted to said side frame intermediate the ends of said lever and sloping downwardly and outwardly below the top of said truck frame, a cylinder supported on said truck frame substantially below the top of said truck frame and at the opposite side of said journal means from said cylinder lever, said cylinder having a piston pivotally connected to the outer end of said cylinder lever below the top of said truck frame.

12. In a brake arrangement, the combination of a truck frame having journal cooperating means, a wheel disposed in supporting relation to said truck frame at said journal means, brake mechanism for said wheel comprising an inner dead brake lever pivotally supported by said truck frame in the plane of said wheel, an outer live brake lever disposed in the plane of said wheel, hangers pivotally supporting said live brake lever to said truck frame, a connection between said brake levers below the wheel center, a dead cylinder lever pivotally connected to said live brake lever, said cylinder lever being pivoted to said side frame intermediate the ends of said lever, a cylinder supported on said truck frame at the opposite side of said journal means from said cylinder lever, said cylinder having a piston pivotally connected to the outer end of said cylinder lever, said brake mechanism being disposed substantially below the top of said frame.

13. In a brake arrangement, the combination of a truck frame having journal cooperating means, a wheel disposed in supporting relation to said truck frame at said journal means, brake mechanism for said wheel comprising an inner dead brake lever pivotally supported by said truck frame in the plane of said wheel, an outer live brake lever disposed in the plane of said wheel, hangers pivotally supporting said live brake lever to said truck frame, a connection between said brake levers below the wheel center, a dead cylinder lever pivotally connected to said live brake lever, said cylinder lever being pivoted to said side frame intermediate the ends of said lever, a cylinder supported on said truck frame at the opposite side of said journal means from said cylinder lever, said cylinder having a piston pivotally connected to the outer end of said cylinder lever, said brake mechanism being disposed substantially below the top of said frame.

14. In a brake arrangement, the combination of a truck frame having journal cooperating means, a wheel disposed in supporting relation to said truck frame at said journal means, brake mechanism for said wheel comprising an inner dead brake lever pivotally supported by said truck frame, an outer live brake lever, hangers pivotally supporting said live brake lever to said truck frame, a connection between said brake levers below the wheel center, a dead cylinder lever pivotally connected to said live brake lever, said cylinder lever being pivoted to said side frame intermediate the ends of said lever, a cylinder supported on said truck frame at the opposite side of said journal means from said cylinder lever, said cylinder having a piston pivotally connected to the outer end of said cylinder lever, said brake mechanism being disposed substantially below the top of said frame.

15. In a brake arrangement, the combination of a truck frame having journal cooperating means, a wheel disposed in supporting relation to said truck frame at said journal means, brake mechanism for said wheel comprising an inner dead brake lever pivotally supported by said truck frame, an outer live brake lever, hangers pivotally supporting said live brake lever to said truck frame, a connection between said brake levers below the wheel center, a dead cylinder lever pivotally connected to said live brake lever, said cylinder lever being pivoted to said side frame intermediate the ends of said lever, a cylinder supported on said truck frame at the opposite side of said journal means from said cylinder lever, said cylinder having a piston pivotally connected to the outer end of said cylinder lever, said brake mechanism being disposed substantially below the top of said frame.

16. In a brake arrangement, the combination of a truck frame having journal cooperating means, a wheel disposed in supporting relation to said truck frame at said journal means, an inner dead brake lever pivotally supported by said truck frame in the plane of said wheel, an outer live brake lever disposed in the plane of said wheel, hangers pivotally supporting said live brake lever to said truck frame, a connection between said brake levers below the wheel center, a dead cylinder lever pivotally connected to said live lever substantially below the top of the wheel, said cylinder lever being pivoted to said side frame intermediate the ends of said lever and sloping downwardly and outwardly below the top of said truck frame, a cylinder supported on said truck frame substantially below the top of said truck frame and at the opposite side of said journal means from said cylinder lever, said cylinder having a piston pivotally connected to the outer end of said cylinder lever below the top of said truck frame, said cylinder lever having an inner extension, and other brake operating means connected to said extension.

17. In a brake arrangement, the combination of a truck frame having journal cooperating means, a wheel disposed in supporting relation to said truck frame at said journal means, an inner dead brake lever pivotally supported by said truck frame in the plane of said wheel, an outer live brake lever disposed in the plane of said wheel, hangers pivotally supporting said live brake lever to said truck frame, a connection between said brake levers below the wheel center, a dead cylinder lever pivotally connected to said live brake lever substantially below the top of the wheel, said cylinder lever being pivoted to said side frame intermediate the ends of said lever and sloping downwardly and outwardly below the top of said truck frame, a cylinder supported on said truck frame substantially below the top of said truck frame and at the opposite side of said journal means from said cylinder lever, said cylinder having a piston pivotally connected to the outer end of said cylinder lever below the top of said truck frame, said cylinder lever having an inner extension, and other brake operating means connected to said extension and extending inboard of said truck frame.

18. In a brake arrangement, the combination of a truck frame having journal cooperating means, a wheel disposed in supporting relation to said truck frame at said journal means, an inner dead brake lever pivotally supported by said truck frame in the plane of said wheel, an outer live brake lever disposed in the plane of said wheel, hangers pivotally supporting said live brake lever to said truck frame, a connection between said brake levers below the wheel center, a dead cylinder lever pivotally connected to said live brake lever substantially below the top of the wheel, said cylinder lever being pivoted to said side frame intermediate the ends of said lever and sloping downwardly and outwardly below the top of said truck frame, a cylinder supported on said truck frame substantially below the top of said truck frame and at the opposite side of said journal means from said cylinder lever, said cylinder having a piston pivotally connected to the outer end of said cylinder lever below the top of said truck frame, additional brake operating means connected to the outer end of said cylinder lever and extending outboard of said truck frame, and operating means for said last named brake operating means disposed substantially on the longitudinal center line of said truck frame.

19. In a brake arrangement, the combination of a truck frame having journal cooperating means, a wheel disposed in supporting relation to said truck frame at said journal means, an inner dead brake lever pivotally supported by said truck frame, an outer live brake lever, hangers pivotally supporting said live brake lever to said truck frame, a connection between said brake levers below the wheel center, a dead cylinder lever pivotally connected to said live brake lever substantially below the top of the wheel, said cylinder lever being pivoted to said side frame intermediate the ends of said lever, a cylinder supported on said truck frame at the opposite side of said journal means from said cylinder lever, said cylinder having a piston pivotally connected to the outer end of said cylinder lever, additional brake operating means connected to the outer end of said cylinder lever and extending outboard of said truck frame, and operating means for said last named brake operating means disposed substantially on the longitudinal center line of said truck frame.

WALTER H. BASELT.

CERTIFICATE OF CORRECTION.

Patent No. 2,163,534. June 20, 1939.

WALTER H. BASELT.

It is hereby certified that error appears in the printed specification of the above numbered patent requiring correction as follows: Page 2, second column, lines 72 and 73, claim 1, strike out the words "brake mechanism for said wheel comprising" and insert the same after "frame," in line 74, same claim; page 3, first column, lines 48 and 49, claim 4, strike out the words "brake mechanism for said wheel comprising" and insert the same after "frame," in line 50, same claim; and that the said Letters Patent should be read with this correction therein that the same may conform to the record of the case in the Patent Office.

Signed and sealed this 15th day of August, A. D. 1939.

Leslie Frazer (Seal) Acting Commissioner of Patents.